Dec. 28, 1943.   E. C. HORTON ET AL   2,338,069
WINDOW OPERATOR FOR MOTOR VEHICLES
Filed Nov. 9, 1940   3 Sheets-Sheet 1
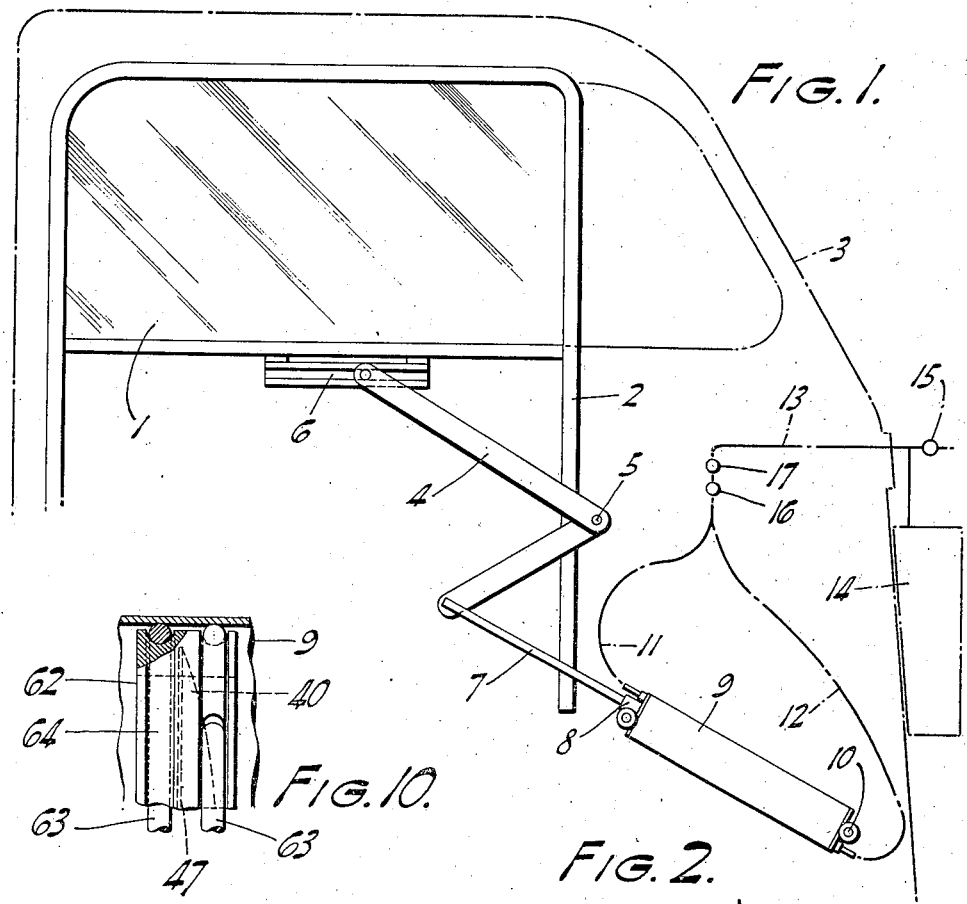
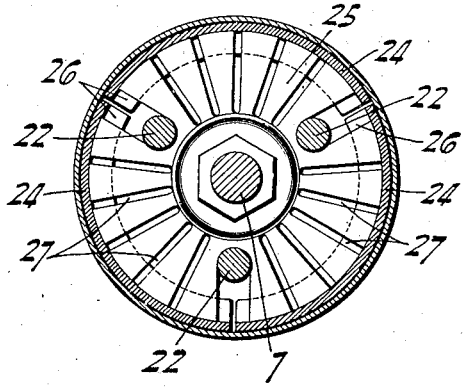
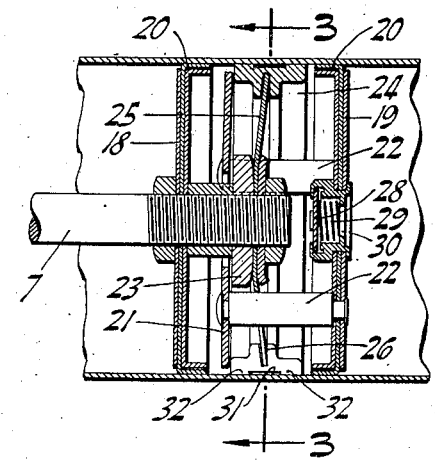
INVENTORS
ERWIN C. HORTON
& ANTON RAPPL
BY
Bean, Brooks, Buckley & Bean
ATTORNEYS Dec. 28, 1943.    E. C. HORTON ET AL    2,338,069
WINDOW OPERATOR FOR MOTOR VEHICLES
Filed Nov. 9, 1940    3 Sheets-Sheet 2
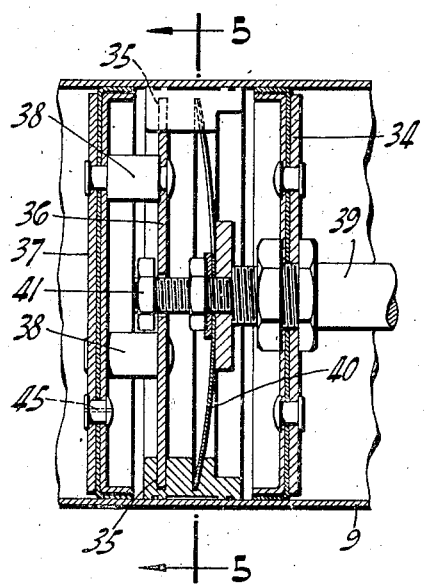
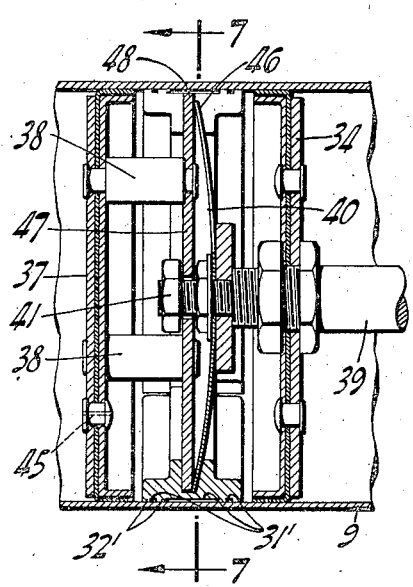
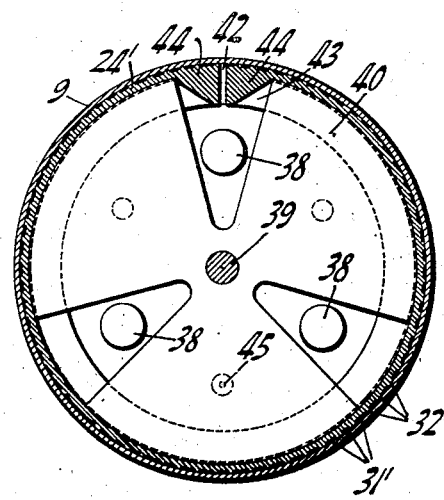
INVENTORS
ERWIN C. HORTON
& ANTON RAPPL
BY
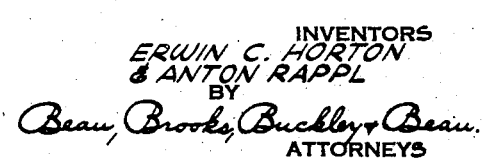
ATTORNEYS Dec. 28, 1943. E. C. HORTON ET AL 2,338,069
WINDOW OPERATOR FOR MOTOR VEHICLES
Filed Nov. 9, 1940 3 Sheets-Sheet 3

INVENTORS
ERWIN C. HORTON
& ANTON RAPPL
BY
Bean, Brooks, Buckley & Bean
ATTORNEYS Patented Dec. 28, 1943

2,338,069

UNITED STATES PATENT OFFICE 2,338,069

WINDOW OPERATOR FOR MOTOR VEHICLES

Erwin C. Horton, Hamburg, and Anton Rappl, Buffalo, N. Y., assignors to Trico Products Corporation, Buffalo, N. Y.

Application November 9, 1940, Serial No. 365,060

24 Claims. (Cl. 121—40)

This invention relates to a window operating mechanism especially adapted for the opening and closing of windows of motor vehicles and it has for its primary object to provide a motor of fluid type which is efficient in operation and yet will lock the window firmly against unauthorized opening from the outside. The invention further has for its object to provide a system for motor vehicle windows in which the power plant will serve as an effective source of low pressure or suction to enable the operation of a window at intervals when the engine is at rest. The invention also has for its object to provide a window regulating mechanism which is practical and durable and one which will lend itself to the present methods of factory mass production.

In the drawings

Fig. 1 is a phantom view of a motor vehicle depicting one embodiment of the present invention applied thereto;

Fig. 2 is a fragmentary longitudinal sectional view through the fluid motor thereof;

Fig. 3 is a transverse sectional view about on line 3—3 of Fig. 2;

Fig. 4 is a view similar to Fig. 2 illustrating a further embodiment of the invention;

Fig. 5 is a transverse sectional view about on line 5—5 of Fig. 4;

Fig. 6 is a view like Fig. 2 of a still further modification;

Fig. 7 is a cross sectional view about on line 7—7 of Fig. 6;

Fig. 10 is a fragmentary showing of a modified lock or clutch shoe construction.

Figure 8:
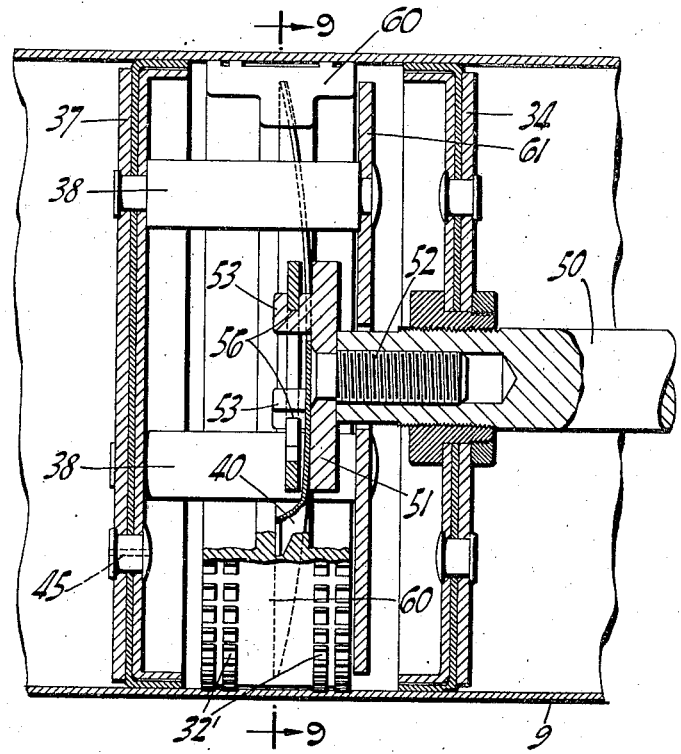
Fig. 8 depicts a still different form of the invention in longitudinal section.

Referring more particularly to the present invention the numeral 1 designates the vertically slidable front window of a motor vehicle, and 2 the vertical guides for the window carried by the door 3 of the motor vehicle. A bell crank 4 is pivoted at 5 on the door body and has one end slidably connected by a track member 6 to the bottom edge of the window 1, the companion arm of the lever being pivotally connected to the rod 7 which is slidable through a stuffing box 8 within the head of a cylinder 9 for supporting the piston hereinafter referred to. The cylinder, whether it be round in cross section or other shape, is mounted at one end by a pivot 10 on the door body, and communication is established between the opposite ends of the motor chamber and a source of pressure by conduits 11 and 12 and a supply line 13. Although a superatmospheric pressure supply may be used, the source of pressure herein preferred is the intake manifold of the motor vehicle power plant and, therefore, a reserve tank 14 and a check valve 15 at the manifold side thereof, closing toward the manifold, may be provided for the opening and closing of the window after the engine has stopped. The pressures at the opposite sides of the piston are, therefore, normally balanced but an operating differential may be provided by means of a "down" valve 16 or an "up" valve 17, the opening of either serving to interrupt the suction communication with the corresponding end of the motor chamber and vent it to the atmosphere. This venting will provide the desired pressure differential for the actuation of the motor and the raising or lowering of the window as the case may be.

The piston comprises a fixed or rod-carried section 18 and a floating section 19, each section having a fluid tight seal with the inner wall of the motor chamber, as by means of cup packing members 20. The floating piston section 19 is coupled to the fixed piston section by a play connection, such as provided by the coupling plate 21, which is supported from the main body of the floating section by spacer studs 22, and a head or enlargement 23 fixed on the inner end of the piston rod between the two piston sections. This play connection enables independent movement of the floating section for preliminarily releasing the lock, as will now be described.

The window lock is herein shown as an expansible brake or clutch for securing the piston and cylinder against relative movement and thereby functioning to lock the window in any position against opening movement is depicted in Figs. 2 and 3 in the form of three shoes 24 which normally have yielding engagement with the chamber wall from their toggle-like support 25. This support is illustrated as being in the form of a spring plate clamped at its center to the piston rod and having radial slots 27 extending through its periphery to define fingers engaging at their free outer ends in pockets or recesses 26 formed in the inner faces of the shoes. The shoes constitute broad active braking surfaces for the individual fingers which latter may ride freely in the pockets. The plate 25 is concave or dished so that its spring fingers will flare or extend at an acute angle to the axis of the piston rod and provide in effect a toggle support for the shoes. Therefore, if the piston rod 7 is pushed to the right, as viewed in Fig. 2, this being the movement which would be imparted upon any attempt to open the window 1 from the outside, the shoes would be forced outwardly and expanded against the chamber wall to secure the piston from sliding thereon. The shoes drag lightly on the chamber wall when being moved to the left by fluid pressure, but upon movement to the right, under the pull of the floating piston section, the coupling plate 21 will initially engage the shoes 24 prior to the head 23, and consequently the brake will be contracted out of contact with the wall of the motor chamber. A light grease or oil may be used to reduce wear of the shoes on the chamber wall. Spacing studs 22 will pass through enlarged radial slots in the shoe supporting plate 25 and thereby hold the piston sections against relative turning.

A check valve 28, held off its seat by a spring 29, is adapted to close the passage 30 through the floating piston section and thereby prevent the build-up of an objectionable pressure differential on the floating section which might momentarily act to hold the shoes out of firm gripping relation with the chamber wall, as when the window is quickly lifted a short distance, followed immediately by a downward push on the window which latter would be permitted by such momentary release of the shoes. The spring 29 is obviously light to prevent interference with the fluid operation of the piston at which time the check valve will instantly seat. When the opposite end of the motor chamber is vented to the atmosphere, the check valve will seat by reason of the pressure differential permitted by the higher pressure which by-passes the cup packing of the fixed piston section to push on the floating piston section.

Means are provided to insure a quick locking or clutching action, for which purpose the active faces of the shoes are formed with recesses 31 for the escape of such lubricant which may be squeezed out from between the thus formed projections 32 and the chamber wall. These recesses facilitate the escape of the lubricant whereby the projections may more readily penetrate the oil film and directly engage the chamber wall when the lock is applied. In the several embodiments illustrated in Figs. 4 through 9 the recesses 31' are multiplied to increase the number and decrease the size of the projections 32', forming in effect small projections or flattened teeth as is shown more clearly in Fig. 8. By reason of these fine projections the shoes will more quickly penetrate the lubricant film to secure firm anchorage on the chamber wall during lock application.

In the embodiment depicted in Figs. 4 and 5, the shoes are provided on their inner faces with guideways 35 to receive the marginal portion of the coupling plate 36 which latter is supported from the floating piston section 37 by the spacing studs 38, the piston rod 39 in this instance being extended beyond both the fixed piston section 34 and the resilient shoe supporting plate 40 to engage its head 41 freely with the coupling plate 36. Consequently, when the floating piston section is subjected to an operating pressure differential its initial movement will pull the shoes free of the chamber wall and against the tension of the supporting plate 40 before it actuates the piston rod to lower the window.

In this particular embodiment the lock shoe 24' is in the form of a complete annulus except for the split indicated at 42 and the pocket or seat 43 which receives the arms of the expansible toggle support as provided by the spring plate 40 may be continuous with the ends adjacent the split 42 blocked by end walls 44. The guideways 35 may likewise have their ends blocked to interlock with the coupling plate 36. This supports the floating piston section against free rotation. In place of the check valve 28 in the embodiment of Figs. 2 and 3, a small bleed passage 45 may be provided through the floating piston section 37 to normally equalize the pressure on opposite sides thereof and serve to prevent any detrimental pressure differential resulting from extraneous window manipulation.

In the further modification illustrated in Figs. 6 and 7 the pockets 46 for the toggle arms of the spring plate 40 are enlarged to receive also the marginal portions of the coupling plate 47 to simplify the assembling of the several parts. The lock is composed of a plurality of shoes 24" which are interlocked with the coupling plate by radial lugs 48 on the latter, such lugs serving to prevent relative rotation of the floating piston section 37. Otherwise, the parts are in a similar relationship to those shown in Fig. 4, except as to dimensional characteristics necessitated by reason of the engagement of the coupling plate in a common pocket with the spring plate and by which the construction is rendered more compact.

Figure 9:
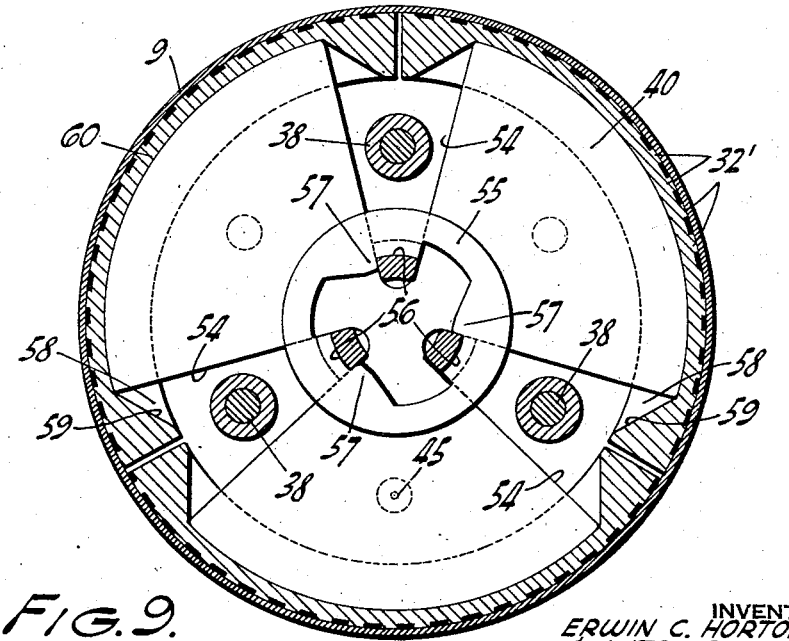
Fig. 9 is a transverse section therethrough about on line 9—9 of Fig. 8.

Figs. 8 and 9 show on an enlarged scale a form of the invention similar to that shown in Figs. 2 and 3, but modified thereover in that the piston rod 50 has its head 51 secured in place by the screw 52, the head being formed with lugs 53 which engage in the slots 54 of the spring plate 40 and project beyond the latter to receive a retaining ring 55 which latter may be rotated to engage in outwardly facing grooves 56 for locking the spring plate in position. Shoulders 57 arrest the ring 55 in position where it is held by frictional contact with the walls of the grooves 56, or by any other suitable manner. The shoes 60 have their pockets or seats 58 closed at both ends by the walls 59 to interlockingly receive the outer ends of the toggle arms of the spring plate 40. The coupling plate 61 is arranged like that in the embodiment of Figs. 2 and 3.

In lieu of the projections 32' the oil film on the wall of the motor chamber may be penetrated effectively by projections about the shoes 62 affording substantially continuous line contact with the chamber wall. This may be accomplished by means of split rings 63 of wire encircling the shoes, as depicted in Fig. 10, wherein the brake shoes are provided with one or more peripheral grooves 64 to receive the rings. As shown, the rings project from the grooves to contact the chamber wall and support the shoes spaced therefrom. Additionally, the rings will embrace the shoes and hold them together when the piston is removed from the motor chamber. Furthermore, these embracing rings will serve to contract the segmental shoe structure and tend to withdraw the latter from contact with the chamber wall when permitted by the spring support, as during the fluid movement of the piston.

In all of the forms illustrated it will be observed that any attempt to push the window downwardly will subject the piston rod to a movement tending to straighten out or bring into a common plane the divergent arms of the toggle support, the dished spring plate serving normally to hold the shoes under a slight pressure against the inner wall of the piston chamber sufficient to grab instantly but insufficient to retard efficient fluid operation. Consequently, the lock will be applied immediately to prevent any slippage of the piston and any opening of the window. This prompt response is encouraged by the formation of the active face of the lock, the projections of which penetrate the oil film while the grooves or channels provide for the ready escape of lubricant as the shoes are being subjected to increased pressure incidental to outside tampering. When the pressure differential is acting on the fixed piston section the shoes will merely drag along, yielding out of locking contact with the chamber wall against the urge of the resilient plate. Fluid operation in the opposite direction will cause the floating piston section to act initially through its coupling plate to remove the shoes from the chamber wall before the final coupling with the piston rod is effected. The window operating mechanism is efficient in its fluid action, while at the same time any attempt to gain entrance to the vehicle by lowering the window either from a fully or from a partially closed position is frustrated by reason of the toggle action serving instantaneously to expand the lock against the cylinder wall. The lock serves effectively to hold the window against opening movement but it will permit the window being closed by a direct lift thereon.

While the foregoing description has been given in detail, it is obvious that the inventive principles herein involved may assume other physical embodiments without departing from the spirit or scope of the invention defined in the appended claims.

What is claimed is:

1. A fluid motor comprising a chamber, a piston having sliding contact with the chamber wall, and means for connecting the piston to a window for movement of the former from the latter, said piston embodying spaced sections each independently operable by fluid pressure for a limited amount of relative movement, means operable for locking the piston against movement in the chamber, and toggle-like means carrying the locking means and operable by the connecting means to operate the locking means, the latter being releasable by and during fluid movement of one of the piston sections.

2. A fluid motor comprising a chamber, spaced piston sections each having sliding contact with the chamber wall and operable by fluid pressure independently of the other section, a piston rod connected to one section, means interconnecting the two sections together for limited relative movement, an expansible lock interposed between the sections, and toggle means between the piston sections and operatively connecting the lock to the rod for expanding the lock upon movement of the rod in an effort to slide the piston sections thereby, said interconnecting means being operatively connected to the lock to render the latter inoperative by and during fluid movement of one of the piston sections.

3. A motor comprising a chamber, a piston therein, a piston rod, an expansible lock, and means operatively connecting the lock to the rod including a toggle-like support carried by the rod and having radiating parts supporting at their outer ends the lock for expanding the latter upon movement of the piston rod in one direction and for idly dragging the lock inoperatively upon movement of the rod in the opposite direction.

4. A motor comprising a chamber, a piston therein, a piston rod, lock means operatively connected to the rod to be actuated thereby for holding the piston arrested, said lock means including an expansible clutching member engageable with a fixed part of the motor and resilient expansive means supporting the clutching member from the rod for idly dragging on said fixed part when the piston rod is manually moved in one direction and operable to actuate the lock means into motion arresting engagement with said fixed part when the rod is moved in the opposite direction, and means operable by the piston during fluid operation to hold the lock means inoperative.

5. A motor comprising a chamber, a piston therein, a piston rod, said piston comprising relatively movable sections each operable by fluid pressure one in one direction and the other in the opposite direction, lock means engageable with a fixed part of the chamber for holding the piston against movement by the rod, a toggle-like support carried for movement by the rod and having radially extending arms supporting the lock means idly with respect to the fixed part upon movement of the rod in one direction and adapted to apply the lock means against the fixed part upon movement of the rod in the opposite direction, and means operable by one of the piston sections for holding the lock means inoperative upon fluid movement of the piston in such opposite direction.

6. A motor comprising a chamber, a piston therein, a piston rod, said piston comprising relatively movable sections each operable by fluid pressure one in one direction and the other in the opposite direction, lock means engageable with a fixed part of the chamber for holding the piston against movement, a support on the rod having radial spring arms held deflected under tension for yieldably holding the lock means for normal idle dragging contact with the fixed part upon movement of the piston rod in said one direction and operable upon movement of the piston rod in such opposite direction to thrust the lock means outwardly against said fixed part and thereby so hold the piston against movement, and means operatively connecting the other of said piston sections to said lock means for holding the latter inoperative during fluid movement of said other section.

7. A motor comprising a chamber, a piston therein, a piston rod, said piston comprising relatively movable sections each operable by fluid pressure one in one direction and the other in the opposite direction, lock means engageable with a fixed part of the chamber for holding the piston against movement and comprising plural shoes, a supporting plate carried by the rod between the sections and having radial spring arms detachably supporting the shoes, said arms being normally held deflected under tension to drag the shoes idly on the fixed part when contacting the same upon movement of the rod in said one direction, resilient means encircling the shoes to hold them on the arms and urge them to their contracted position, and means operatively connecting said other section to the shoes to remove the latter from said fixed part upon fluid movement of such other section.

8. A fluid motor comprising a chamber, a piston formed of spaced relatively movable sections each having means serving to fluid seal the same for sliding contact on the chamber wall in one direction only and in a direction opposite to the fluid imparted movement of the other section whereby one section will be acted on by the fluid pressure to drive the piston in one direction and the companion section will be acted on by the fluid pressure to drive the piston in the opposite direction, a power transmitting member connected to said one piston section for transmitting power to and from the latter, lock shoe means operable against a fixed part of the chamber for interlocking the piston and chamber against relative movement, a toggle-like support carried by said one section and mounting the shoe means for expansion and contraction, said support arranged to expand the shoe upon a member imparted movement of said one section in the direction in which said companion section is fluid operable, and means operable by the companion section for holding the support against operable expansion of the shoe means.

9. A motor having a chamber, a piston slidable therein, a rod connected to the piston, a lock having a face with a plurality of lubricant penetrating projections engageable with the chamber wall, means operable by the rod to apply the lock against the chamber wall, and fluid operated means for rendering the lock inoperative.

10. A motor having a chamber, a piston slidable therein, a rod connected to the piston, an arcuate lock shoe having its outer face engageable with a fixed part of the chamber and its inner face formed with a pocket, a support for the shoe including an arm pivotally connected at one end to the piston rod and having its outer end pivotally engaged in the shoe pocket, said support acting to hold the shoe normally against the fixed part with the arm at an acute angle to the rod whereby movement of the latter in one direction will cause the arm to press the shoe out against the wall more firmly and in the opposite direction will cause the shoe to remain ineffective, and means for rendering the shoe ineffective upon fluid-impelled movement of the piston.

11. A motor having a chamber, a piston slidable therein, a rod connected to the piston, an arcuate lock shoe having its outer face engageable with the chamber wall and its inner face formed with a bearing, a support for the shoe including an arm pivotally carried at one end by the piston rod and having its outer end pivotally engaged in the shoe bearing, said support acting to hold the shoe normally against the wall with the arm at an acute angle to the rod whereby movement of the latter in one direction will cause the arm to press the shoe out against the wall more firmly and in the opposite direction and will cause the shoe to remain inoperative, the piston having a floating section operable by fluid pressure to move the piston rod in the first direction having a play connection with the remaining body section of the piston for relative movement, and means operable as a part of the floating section and by such fluid imparted relative movement of the latter to render the shoe inoperative preliminary to moving the body section.

12. A motor having a chamber, a piston slidable therein, a rod connected to the piston, an arcuate lock shoe having its outer face engageable with the chamber wall and its inner face formed with a bearing, a support for the shoe including an arm pivotally carried at one end by the piston rod and having its outer end pivotally engaged in the shoe bearing, said support acting to hold the shoe normally against the wall with a part of the arm at an acute angle to the rod whereby movement of the latter in one direction will cause the arm to press the shoe out against the wall more firmly and in the opposite direction will cause the shoe to remain inoperative, the piston having a floating section operable by fluid pressure to move the piston rod in the first direction, and a plate spaced from and carried by the floating section and having an opening through which the rod extends, the protruding portion of the rod having an enlargement adapted to be engaged by the plate by and during the fluid movement of the floating section, said plate also engageable with the shoe to disengage the latter from the chamber wall, the engagement of the plate with the shoe being preliminary to its engagement with the enlargement.

13. A fluid motor comprising a chamber, a piston formed of spaced relatively movable sections each having means serving to fluid seal the same for sliding contact on the chamber wall in one direction only and in a direction opposite to the fluid imparted movement of the other section whereby one section will be acted on by the fluid pressure to drive the piston in one direction and the companion section will be acted on by the fluid pressure to drive the piston in the opposite direction, a power transmitting member connected to said one piston section for transmitting power to and from the latter, a plurality of lock shoes operable against a fixed part of the chamber for locking the piston against movement, a toggle-like support carried by said one section and having radiating arms engaging in bearings in the shoes for mounting the latter for relative expansion and contraction, said supporting arms being biased in a manner to expand the shoes upon a member imparted movement of said one section in the direction of fluid movement of said companion section and to support the shoes idly in the opposite direction of movement, resilient means acting to contract the shoes in accordance with the toggle-like support while permitting expansion of the shoes by and during the expansive action of the support, and means operable by the companion section to contract the support by and during fluid operation of said companion section.

14. A motor having a chamber and a member therein movable relative thereto by a fluid pressure differential, means for operatively connecting the motor to a window or the like, means normally operative to hold the connecting means against movement and including an annular expansible locking member of wire having a cross section to provide a line contact with the chamber wall, means operable to expand the locking member upon movement by the connecting means, and means operable by the motor for rendering the holding means inoperative.

15. A motor having a chamber and a member therein movable relative thereto by a fluid pressure differential, means for operatively connecting the motor to a window or the like, an expansible lock consisting of an open ring of wire having a circular cross section carried by a moving part of the mechanism and expansible by said connecting means against a fixed part for restraining movement of the motor, and means operable by the motor to contract the ring for fluid operation of the window.

16. A motor having a piston and a chamber receiving the piston and slidable relative thereto, a lock carried by the piston and expansible against the chamber wall to hold the piston and chamber against relative movement, and means for expanding the lock, the active face of the lock having a row of oil film penetrating projections for operatively contacting the chamber wall.

17. A motor having a piston and a chamber receiving the piston and slidable relative thereto, a lock carried by the piston and expansible against the chamber wall to hold the piston and chamber against relative movement, said lock comprising a circular series of shoes, means within the series for expanding the shoes, and a shoe retaining ring encircling the series and constituting the active face of the lock for engaging the chamber wall.

18. A fluid motor comprising a chamber, a piston formed of spaced relatively movable sections each having means serving to fluid seal the same for sliding contact on the chamber wall in one direction only and in a direction opposite to the fluid imparted movement of the other section whereby one section will be acted on by the fluid pressure to drive the piston in one direction and the companion section will be acted on by the fluid pressure to drive the piston in the opposite direction, a power transmitting member connected to said one piston section for transmitting power to and from the latter, a plurality of lock shoes operable against a fixed part of the chamber for locking the piston against movement, a toggle-like support carried by said one section and having radiating arms engaging in bearings in the shoes for mounting the latter for relative expansion and contraction, said supporting arms being biased in a manner to expand the shoes upon a member imparted movement of said one section in the direction of fluid movement of said companion section and to support the shoes idly in the opposite direction of movement, resilient means acting to contract the shoes in accordance with the toggle-like support while permitting expansion of the shoes by and during the expansive action of the support, and means connecting the companion section to said one section for limited relative movement and acting during such relative movement to disengage the shoes from said fixed part.

19. A motor having a chamber, a piston therein, one of said elements having a member adapted for connection to a window to actuate the same, and clutch means operable by a member imparted movement of the connected element to arrest such relative movement, said clutch means embodying a plate spaced from and carried by the connected element, expansible parts having sliding engagement with the other of said first two named elements, said parts having an inner face formed with a pocket detachably and slidably receiving the margin of said plate for guiding support thereby, said parts being held against displacement from the plate by said other element, and means for expanding said parts into clutching engagement by such member imparted movement.

20. A motor having a chamber, a piston therein, one of said elements having a member adapted for connection to a window to actuate the same and movable by said member with respect to the other element, clutch means operable by a member imparted movement of the connected element to arrest such relative movement, said clutch means embodying expansible shoe means having sliding engagement with the other of said first two named elements and resilient expanding means movable relative to and operatively connecting the shoe means to said connected element to be actuated by a member imparted movement of the connected element in one direction for subjecting the parts to an expansive clutching urge, and resilient means acting on said shoe means independently of the shoe expanding means to contract the shoe means when permitted by said shoe expanding means during fluid operation of the motor.

21. A fluid motor comprising a chamber, a piston slidable therein, a power transmitting member connected to said piston by a play connection permitting limited relative movement of the piston when initially operated by the fluid pressure in one direction, expansible lock means normally disposed in its contracted form, means carried by said member for expanding said lock means against a fixed part of the chamber upon movement of said member independently of the piston and in the direction of fluid movement of the latter, and means preliminarily engageable with the lock means during the play movement of the piston for disengaging the lock means from the fixed part and thereafter to impart movement to said member when the play in the connection has been absorbed.

22. A fluid motor comprising a chamber, a piston having sliding contact with the chamber wall, and means for connecting the piston to a window for movement of the former from the latter, said piston embodying spaced sections each operable by fluid pressure with one fixedly related to the connecting means and the other connected to the latter for a limited amount of relative movement, means operable for locking the piston against movement in the chamber, and means carrying the locking means and operable by movement of the connecting means in one direction to operate the locking means, the latter being releasable by and during fluid movement of either piston section, said other piston section having a pressure equalizing passage therethrough serving to equalize the pressures on the opposite sides thereof when moved by said connecting means in the opposite direction whereby said locking means will function immediately upon reversal of movement in the first direction of said connecting means unhindered by any counteracting pressure differential which would be effective on said other section.

23. A fluid motor comprising a chamber, a piston formed of spaced relatively movable sections each having means serving to fluid seal the same for sliding contact on the chamber wall in one direction only and in a direction opposite to the fluid imparted movement of the other section whereby one section will be acted on by the fluid pressure to drive the piston in one direction and the companion section will be acted on by the fluid pressure to drive the piston in the opposite direction, a power transmitting member connected to said one piston section for transmitting power to and from the latter, lock shoe means operable against a fixed part of the chamber for interlocking the piston and chamber against relative movement, and a toggle-like support carried by said one section and mounting the shoe means for expansion and contraction, said support having a part operable to render operative the lock shoe means upon a member imparted movement of said one section in the direction in which said companion section is fluid operable, and said companion section having a part operable during fluid movement for holding the lock shoe means inoperative.

24. A motor comprising a chamber, a piston therein, a piston rod, lock means operatively connected to the rod to be actuated thereby for holding the piston arrested, said lock means including expansible and contractible clutching means engageable with a fixed part of the motor and a toggle-like support supporting the clutching means from the rod for idly dragging on said fixed part when the piston rod is manually moved in one direction and operable to actuate the lock means into motion arresting engagement with said fixed part when the rod is moved in the opposite direction, and means operable by the piston during fluid operation to hold the lock means inoperative.

ERWIN C. HORTON.
ANTON RAPPL.